United States Patent
Sigel

[11] Patent Number: 6,101,951
[45] Date of Patent: Aug. 15, 2000

[54] ROBOT FOR THE REPAIR OF SEWER PIPES

[75] Inventor: Alwin Sigel, Martin, Australia

[73] Assignee: Scheiff GmbH, Euskirchen, Germany

[21] Appl. No.: 09/003,142

[22] Filed: Jan. 6, 1998

[30]   Foreign Application Priority Data

Jan. 10, 1997 [DE] Germany ............ 297 00 298 U

[51] Int. Cl.[7] ........................................ B61B 13/10
[52] U.S. Cl. ............................................ 104/138.2
[58] Field of Search ................... 104/138.2, 138.1; 105/78; 166/297; 451/5; 180/9.5

[56]   References Cited

U.S. PATENT DOCUMENTS

| | | | |
|---|---|---|---|
| 3,872,940 | 3/1975 | Gambini | 180/9.5 |
| 4,006,359 | 2/1977 | Sullins et al. | 104/138.2 |
| 4,369,713 | 1/1983 | Richardson | 104/138.2 |
| 4,458,601 | 7/1984 | Braithwaite et al. | 104/138.2 |
| 4,648,454 | 3/1987 | Yarnell | 166/297 |
| 4,654,702 | 3/1987 | Tolino et al. | 104/138.2 |
| 5,388,528 | 2/1995 | Pelrine et al. | 104/138.2 |
| 5,392,715 | 2/1995 | Pelrine | 104/138.2 |
| 5,497,707 | 3/1996 | Box | 104/138.2 |
| 5,520,569 | 5/1996 | Endoh | 451/5 |
| 5,551,349 | 9/1996 | Bozdin | 104/138.2 |

FOREIGN PATENT DOCUMENTS 0618398   3/1994   European Pat. Off. .

Primary Examiner—S. Joseph Morano
Assistant Examiner—Lars A. Olson
Attorney, Agent, or Firm—Diller, Ramik & Wight

[57]   ABSTRACT

A robot for the repair of sewer pipes comprises a carriage unit driven by a traction motor (2) arranged internally of a carriage housing (1) with wheels (7,9). The carriage housing (1) is connected to a rotary head (15) arranged immediately before the carriage housing (1). The rotary head (15), having tools and/or inspection devices mounted thereon, is driven by rotary motor (22). The traction motor (2) and the rotary motor (22) are arranged in a mutually overlapping relationship. The rotary head (15) is connected to a hollow shaft (23) extending through the whole carriage housing (1). The rotary head (15) is adapted for attachment of a robot arm carrying a tool support. A swivel arm of the robot arm as well as the tool support can be swiveled by hydraulic cylinders. The end of the robot arm facing away from the rotary head (15) is provided with a support wheel.

14 Claims, 2 Drawing Sheets

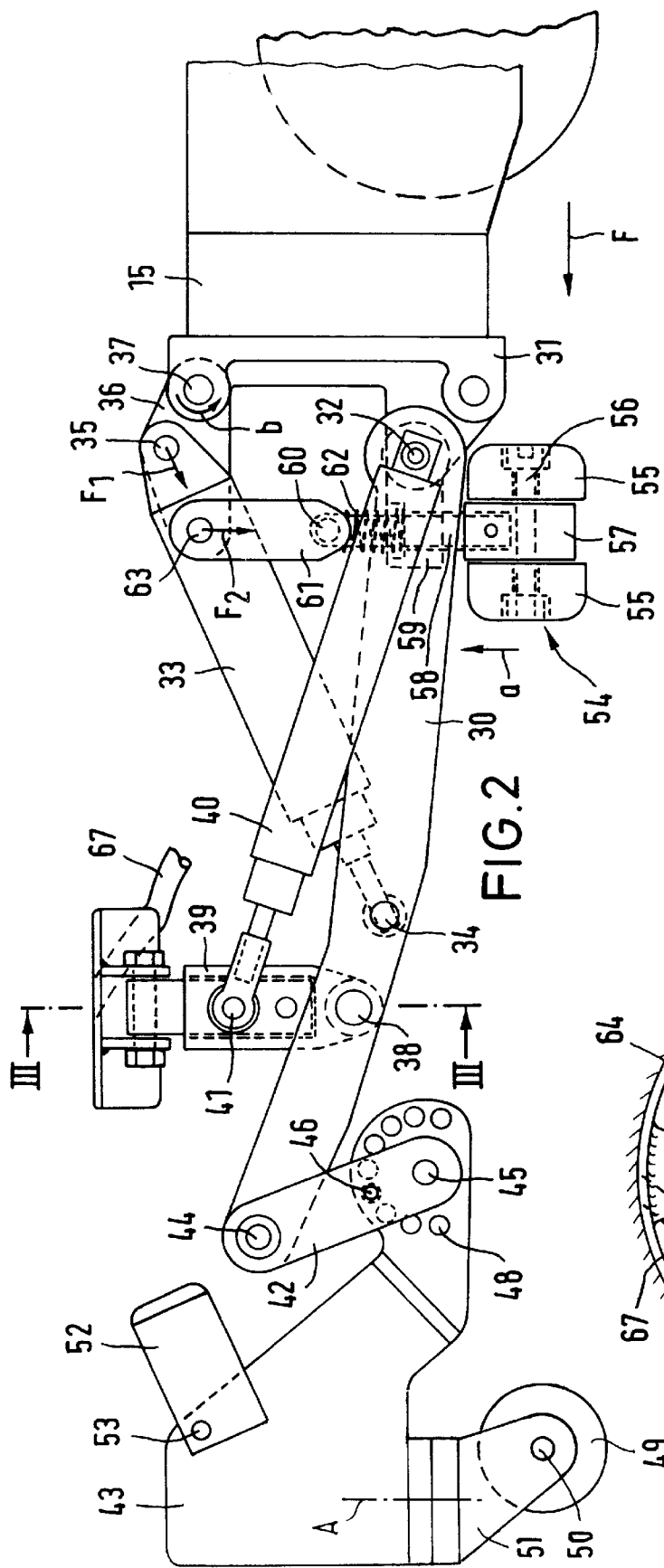

ROBOT FOR THE REPAIR OF SEWER PIPES

The present invention relates to a robot for the repair of sewer pipes.

BACKGROUND OF THE INVENTION

The use of robots in the repair of sewer pipes which are not man-sized is already known. Such robots, which are provided with a drive means for moving them through sewer pipes, are suitable, e.g., for the cleaning of sewer pipes, for grinding off irregularities or protrusions or for the mending of leaks.

A known multi-segment robot for the above purposes is provided with a rotary head carrying a plurality of treatment tools and a camera. By means of a rotary motor, the rotary head and the robot arm connected thereto can be rotated in a controlled manner by up to 500° about the longitudinal axis. Behind the rotary motor, which is supported on the sewer pipe wall by support wheels, a switch and relay unit is arranged for controlling the functions of the motor.

If, for instance, the robot is used to fill leaks or other gaps, a press-out container will be arranged behind the switch and relay unit. The material to be applied is pressed via a hose from the press-out container to the tool arranged on the rotary head and thus can be applied by the tool.

Arranged behind the press-out container is a carriage unit for moving the multi-segment robot through the sewer pipe under treatment. For this purpose, the carriage, serving as a tractor, comprises a plurality of wheels driven by a traction motor.

Since the above outlined known robot for the repair of sewer pipes has an overall length of about 120 cm, this robot is unfit for use in short sewer pipes, as, for instance, in sewer pipes for land drainage or in industrial wastewater drainpipes, particularly because such sewer pipes are often accessible only with difficulties. In some cases, the only possible approach is to insert the individual segments of the elongate robot separately into the sewer pipe and to reassemble them directly at the entrance of the sewer pipe. Such a procedure is extremely time-consuming and difficult.

A further robot for use in sewer pipes which are not man-sized, known from EP 0 618 398 A1, comprises, internally of a carriage housing, a traction motor driving the wheels, and a rotary motor driving a rotary head, with the traction motor and the rotary motor overlapping each other. Depending on the type of the tool or inspection instrument mounted to the rotary head, movement of the rotary head must be performed, e.g., at a very high speed, with very high accuracy or with a very high moment of rotation. If this known robot is to fulfill these different demands, bothersome resetting work has to be performed on it.

It is an object of the invention to provide a robot for the repair of sewer pipes which is of a compact constructional size, is useful also under unfavorable space conditions and is conveniently adapted to different demands.

SUMMARY OF THE INVENTION

According to the invention, a robot for the repair of sewer pipes comprises a carriage unit which, in a carriage housing with wheels thereon, includes a traction motor for driving the wheels. Further, immediately before the carriage unit forming the locomotive of the robot, a rotary head is provided to have operating tools and/or inspection devices mounted thereon. The rotary head is driven by a rotary motor arranged in overlapping relationship with the traction motor.

The arrangement of the rotary head immediately on the carriage housing and the mutual overlapping of the two motors—which thus are arranged beside or above each other—make it possible that the inventive robot for the repair of sewer pipes has a considerably reduced length in comparison with other robots. As a result of the short constructional size realized in the above manner, the robot can be used also under restricted space conditions. Further, the need to reassemble the robot in the sewer pipe is eliminated, thus obviating possible errors in the reassembly process, such as those causing an insufficient sealing or contact between the individual segments. Therefore, the inventive robot is suitable for a larger variety of applications.

According to the invention, the rotary motor is mounted to the carriage housing externally thereof. The transmission-side end of the rotary motor extends into the carriage housing and is connected to the rotary head. Thus, the rotary motor can be removed from the carriage housing in a simple manner and be replaced by another rotary motor simply by inserting the transmission-side end of the other motor into the carriage housing. This allows for an easy exchange of the rotary motor, e.g. when a rotary motor of a higher capacity is required. Further, the attachment of the rotary motor outside the carriage housing allows for a simplified assembly process for the robot.

Preferably, the rotary head is connected to a hollow shaft extending through the whole carriage housing. Thus, the control and drive conduits or the hoses for the material supply can be guided in a simple manner from the tools and/or the inspection devices via the rotary head and through the carriage housing to the rear.

Since the rotary head is fixedly attached to the hollow shaft, it is made possible to secure the rotary head on the rear end of the carriage housing facing away from the rotary head, thus precluding that the rotary head is pulled in the forward direction, i.e. in the direction of the operating tools. This is particularly advantageous because no space need be used in the region of the rotary head for securing it against withdrawal.

If, for instance, the robot is to be utilized to introduce material into the sewer pipe for the filling of joints, a press-out container can be arranged, by means of a connection member, on the rear end of the carriage housing, i.e. the end thereof facing away from the rotary head.

The invention further relates to a robot arm connected to the rotary head of a robot for the repair of sewer pipes.

For treatment of the sewer pipe wall, e.g. for grinding off uneven portions or for mending cracks, the robot arm connected to the rotary head has tools and—if required—a camera for observation mounted thereon. Due to the forces occurring during treatment of the sewer pipe wall, it often happens that the part of the robot carrying the rotary head is undesirably tilted. In such cases, a well-aimed guidance of the tool and thus a correct treatment of the sewer pipe wall are rendered impossible. For this reason, the forces that can be applied onto the sewer pipe wall are limited.

It is a further object of the invention to improve the robot arm of a robot for the repair of sewer pipes.

According to the invention, the above further object is solved by a robot for the repair of sewer pipes, comprising a carriage unit including, within a carriage housing with wheels, a traction motor driving the wheels, and comprising a rotary head to be driven by a rotary motor and having mounted thereon a robot arm carrying treatment tools and/or inspection devices, wherein the robot arm, on its end facing away from the rotary head, is provided with a support wheel for taking up treatment forces.

The robot for the repair of sewer pipes comprises a carriage unit provided with wheels driven by a traction motor, and a rotary head driven by a rotary motor and connected to a robot arm according to the invention.

To prevent a tilting of the robot in case of high treatment forces, a support wheel is provided on the end of the robot arm facing away from the rotary head. Thus, the robot arm is adapted to take up higher treatment forces. Since the support of the robot arm is realized by a support wheel, the robot can be moved in the longitudinal direction of the sewer pipe while keeping the robot arm supported. This offers the advantage that the robot arm can also have such tools mounted thereon which otherwise would tilt the robot due to their weight. Preferably, the support wheel is arranged on a side opposite to a tool support connected to the robot arm. Because of the favorable force configurations realized by the provision of a support wheel, the robot arm can have a very small width.

To rotate the robot arm by means of the rotary head also in the instant embodiment, the orientation of the support wheel is preferably made adaptable to the movement of the robot arm. This is achieved, e.g., in that the support wheel can be turned about an axis arranged vertically to the rotational axis of the support wheel. Thus, the support wheel will self-adjust in accordance with the moving direction of the robot arm.

Preferably, the robot arm comprises a swivel arm and a support arm articulated to each other. The support wheel is mounted to the support arm so that the latter, because of the joint connecting the swivel arm and the support arm, will always remain in abutment on the sewer pipe wall also when the swivel arm is swiveled. To avoid a displacement of the support wheel during the treatment of the sewer pipe wall, the articulated connection, preferably provided as a double joint, can be locked in position.

In case of very high operating forces, it may happen that—in spite of the support wheel—the rotary head and the tool-side end of the robot, respectively, are tilted about the tool-side wheel of the robot. Such a displacement of the rotary head entails a decrease the accuracy of the tool movement. Thus, according to the invention, the end of the robot arm facing toward the rotary head is additionally provided with a support leg. Since the tool support is arranged between the support leg and the support wheel, the treatment forces are substantially taken up by the support wheel and the support leg, thus precluding a tilting of the robot and a resultant disturbance of the position of the tool.

The support leg also has to take up forces in the longitudinal direction of the sewer pipe, so that the support leg must not comprise a support roll that is rotatable in the longitudinal direction of the sewer pipe. Thus, in a moving operation, it is necessary that the support leg be retracted or lifted relative to the sewer pipe wall. According to the invention, the support leg is lifted by the action of a spring when a drive operation is performed. Under the effect of the forces generated in the direction of the sewer pipe wall when advancing a tool, the support leg is pressed onto the sewer pipe wall against the force of the spring. Thus, the support leg touches the sewer pipe wall only during the treatment process.

Preferably, the support leg is provided as a wheel having its axis of rotation oriented in the longitudinal direction of the sewer pipe or the robot, respectively. In this manner, on the one hand, the support leg can roll in the circumferential direction on the sewer pipe wall when the robot arm is rotated by the rotary head, while, on the other hand, it is still precluded that the wheel of the support leg can roll in the longitudinal direction of the sewer pipe.

BRIEF DESCRIPTION OF THE DRAWINGS

A preferred embodiment of the invention will be described in greater detail hereunder with reference to the drawings.

FIG. 2 is a systematic side view of a preferred embodiment of the robot arm according to the invention as connected to the robot; and FIG. 3 is a sectional view along the line III—III in FIG. 2.

DESCRIPTION OF A PREFERRED EMBODIMENT

Figure 1:
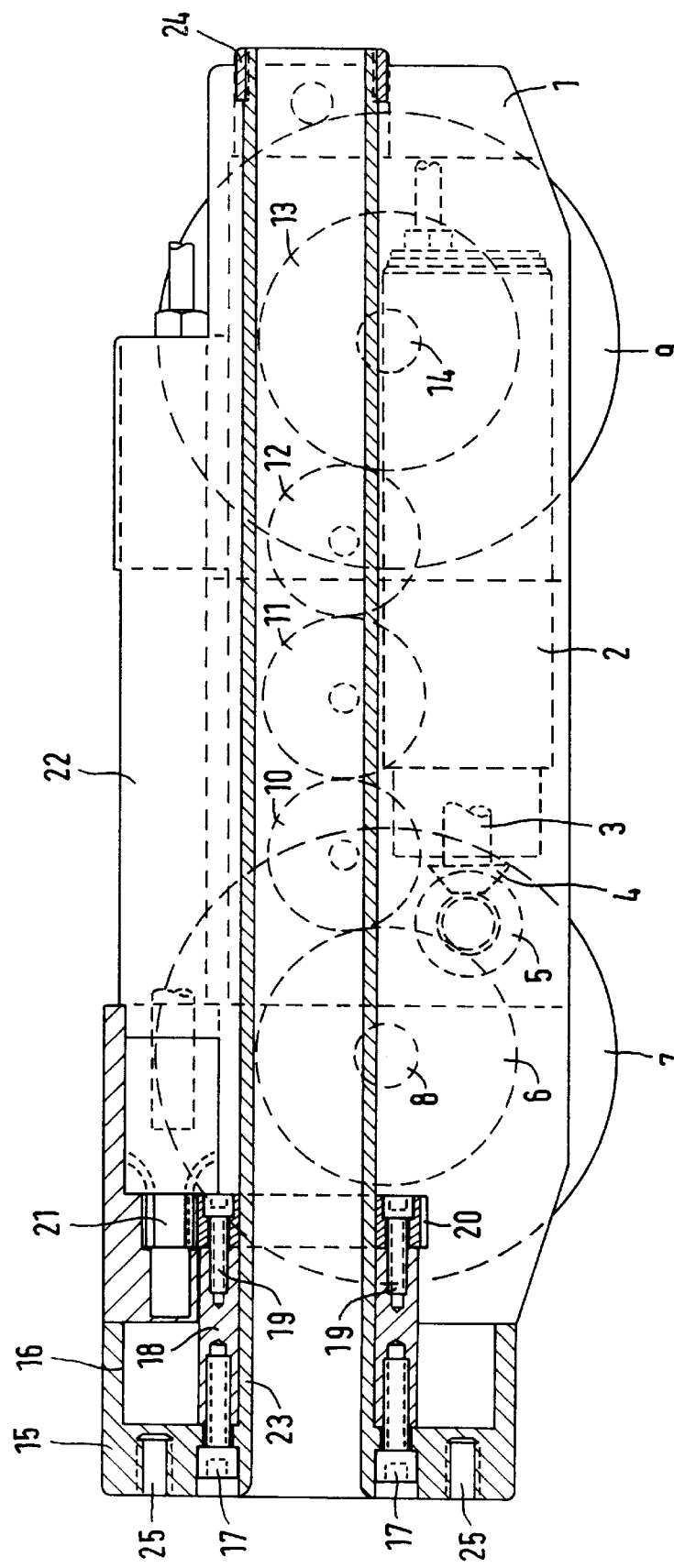
FIG. 1 is a systematic side view of a preferred embodiment of the robot according to the invention.

The systematic side view of FIG. 1 shows a robot for the repair of sewer pipes, comprising a traction motor 2 arranged in a carriage housing 1. On the output shaft 3 of traction motor 2, a bevel gear 4 is provided for meshing engagement with a second bevel gear 5 arranged vertically to bevel gear 4. The toothing of bevel gear 5 engages a complementary toothing of a gear wheel 6 tightly connected to a wheel 7. Wheel 7 is supported for rotation on an axis 8 in carriage housing 1.

For driving a second wheel 9, gear wheel 6 is arranged to engage a gear wheel 13 via three gear wheels 10,11,13 likewise supported in carriage housing 1. Gear wheel 13, in turn, is tightly connected to the wheel 9 supported for rotation on an axis 14 in carriage housing 1. Also the wheels provided opposite to the two wheels 7,9 are driven—via a gear transmission (not shown)—by traction motor 2, output shaft 3 and bevel gear 4 so that all of the four wheels of the robot are driven.

The robot further comprises a rotary head 15 rotatably connected to carriage housing 1 and supported to rotate about the longitudinal axis of carriage housing 1. Rotary head 15 is supported, via a sliding surface, for rotation on carriage housing 1. Bores 25 are provided for connecting tools or other devices to rotary head 15. Rotary head 15 is connected by bolts 17 to a shell 18 which in turn is connected by bolts 19 to a gear wheel 20. Gear wheel 20 is driven by a gear wheel 21 which itself can be driven by a rotary motor 22. In this manner, rotary head 15 is rotatable by rotary motor 22. Rotary head 15 has a rotation-limiting stopper arranged thereon for limiting the maximum rotation to 500°.

Further, rotary head 15 has a hollow shaft 23 fixedly connected thereto by press-fitting the latter in the shell 18 fixed to rotary head 15. Hollow shaft 23 extends in the longitudinal direction through the whole carriage housing 1. On the rear end of carriage housing 1 facing away from rotary head 15, hollow shaft 23 is secured by a nut 24 to prevent a withdrawal of rotary head 15 in the left direction in FIG. 1.

FIG. 2 shows a systematic view of a preferred embodiment of a robot arm connected to the robot for the repair of sewer pipes. Connection of the robot arm to rotary head 15 is effected by a mounting portion 31. A swivel arm 30 of the robot arm is arranged to swivel about a pivot pin 32. For this purpose, swivel arm 30 is rotatably connected, by means of a pivot pin 34, to a hydraulic cylinder 33. Hydraulic cylinder 33 is further connected by a pivot pin 35 for rotation on a triangular deflection member 36 which in turn is rotatably connected by a pivot pin 37 to mounting portion 31.

Further, swivel arm 30 is connected by a pivot pin 38 to a tool support 39. Tool support 39 can be swiveled about pivot pin 38 by means of a hydraulic cylinder 40 connected to tool support 39 by a pivot pin 41 and connected to mounting portion 31 by pivot pin 32. Tool support 39 is provided to take up a tool to be described later on in connection with FIG. 3, or any other tool useful in sewer pipe repair.

The end of swivel arm 30 facing away from rotary head 15 is connected to a support arm 43 of the robot arm by means of a rod-shaped intermediate connecting member 42. Connecting member 42 is rotatably connected to swivel arm 30 by a pivot pin 44, as well as to support arm 43 by a pivot pin 45, thus providing for a double joint between swivel arm 30 and support arm 43. The joint arranged between intermediate connecting member 42 and support arm 43 can be fixed in position by inserting a pin 46 both into a bore provided in intermediate connecting member 42 and into a respective bore 48 provided in support arm 43. The bores 48 are arranged along a circular line so that different angular positions can be realized between intermediate connecting member 42 and support arm 43.

For supporting the swivel arm 30, support arm 43 comprises a support wheel 49 rotatable about a rotary axle 50 supported in a receiving portion 51. Receiving portion 51 can be turned about an axis A extending vertically to rotary axle 50 so that the position of support wheel 49 will always automatically adapt to the conditions in the environment.

Further, support arm 43 is provided with an auxiliary instrument, e.g. a camera 52. Camera 52 can be used for monitoring the function and the position of the tool mounted to tool support 39. Camera 52 can be turned about an axis 53.

Further, a support leg 54 is provided on the end of the robot arm facing toward the rotary head 15 and is arranged to be lifted off the sewer pipe wall during a moving operation. The embodiment of support leg 54 shown in FIG. 2 comprises two rolls 55 rotatably supported transversely to the moving direction F on a axis 56 in the base portion 57 of support leg 54. Base portion 57 is fixedly mounted to a piston 58 arranged for displacement in an extension 59 of mounting portion 31 and rotatably connected to a deflection member 61 by a pivot pin 60. In a moving operation, i.e. when the robot is moving in the sewer pipe and no treatment by a tool is performed on the sewer pipe wall, support leg 54 is lifted off the sewer pipe wall in the direction of the arrow a by means of a spring 62. Also the rod-shaped deflection member 61 is rotatably connected by a pivot pin 63 to the triangular deflection member 36 having the cylinder 33 connected thereto.

The lowering of the support leg 54 will be described in greater detail hereunder. In the non-moving condition of the robot, swivel arm 30 is swiveled by hydraulic cylinder 33 about pivot pin 32 in upward direction as shown in FIG. 2 so that the tool attached to tool support 39 is advanced to the sewer pipe wall. In the process, the length of hydraulic cylinder 33 is reduced so that pivot pin 35 is subjected to a force $F_1$ in the direction of pivot pin 34. Since hydraulic cylinder 33 is connected, by pivot pin 35, for rotation on triangular deflection member 36 and the latter is—likewise rotatably—connected to mounting portion 31 by pivot pin 37, the triangular deflection member 36 will be turned by the force $F_1$ in the direction of arrow b about pivot pin 37. In this manner, the rod-shaped deflection member 61 is subjected, via pivot pin 63, to a force $F_2$ acting in a downward direction according to FIG. 2. Under the influence of force $F_2$, support leg 54 is moved against the spring force of a spring 62 in a downward direction according to FIG. 2. Thus, when applying the tool, support leg 54 is pressed against the sewer pipe wall.

Once the tool is retracted from the sewer pipe wall, also support leg 54 is lifted off the sewer pipe wall by the spring 62 supported on extension 59 of mounting portion 31. Thus, it is safeguarded that support leg 54 will always be lifted off the sewer pipe wall during a moving operation. The provision that the lifting of support leg 54 by means of spring 62 is automatically performed as soon as the tool is retracted from the sewer pipe wall, obviates the problem that the operator might forget to lift the support leg 54, thus precluding that the support leg 54 would impede a further movement of the robot.

FIG. 3 is a systematic sectional view along the line III—III in FIG. 2, showing an example of a tool mounted to tool support 39. The exemplary tool shown is an injection tool for injecting a sealing agent into cracks in the sewer pipe wall. For this purpose, tool support 39 has extensions 68 of an injection foot support 64 pivotally connected thereto via a pivot pin 65 and a connection member. The curvature of the injection foot support 64 corresponds to the curvature of the sewer pipe wall illustrated by a circular arc 66. The sealing agent to be ejected is supplied through a hose 67. Hose 67 is guided from injection foot support 64 through hollow shaft 23 to the rear end of the robot facing away from rotary head 15 (FIGS. 1 and 2) and finally into a supply container.

As further shown in FIG. 3, tool support 39 is swiveled by two hydraulic cylinders 40 which in FIG. 2 are arranged behind each other and are connected to tool support 39 by pivot pins 41.

What is claimed is:

1. A robot for the repair of sewer pipes, comprising a carriage unit including, within a carriage housing (1) with wheels (7,9), a traction motor (2) driving the wheels (7,9), and comprising a rotary head (15) to be driven by a rotary motor (22) and having tools and/or inspection devices mounted thereon, the traction motor (2) and the rotary motor (22) being arranged in a mutually overlapping relationship, wherein the rotary head (15) is arranged immediately before the carriage housing (1) of the carriage unit and the rotary motor (22) is mounted as a separate unit on the carriage housing (1) and has a transmission-side end extending into a portion of the carriage housing (1).

2. The robot according to claim 1, wherein the rotary head (15) is connected to a hollow shaft (23) extending through the whole carriage housing (1).

3. The robot according to claim 2, wherein the hollow shaft (23) on the rear end of the carriage housing (1) facing away from the rotary head (15) is secured against withdrawal in the forward direction.

4. The robot according to claim 2, wherein the hollow shaft (23) on its rear end facing away from the rotary head (15) is provided with a coupling member for connection to a press-out container.

5. The robot according to claim 1, wherein a switch and relay unit is accommodated in the carriage housing (1).

6. A robot for the repair of sewer pipes, comprising a carriage unit including, within a carriage housing (1) with wheels (7,9), a traction motor (2) driving the wheels (7,9), and comprising a rotary head (15) to be driven by a rotary motor (22) and having mounted thereon a robot arm (30,43) carrying treatment tools and/or inspection devices, wherein the robot arm (30,43), on an end facing away from the rotary head (15), is provided with a support wheel (49) for taking up treatment forces.

7. The robot according to claim 6, wherein the support wheel (49) is arranged on a side opposite to a tool support (39) connected to the robot arm (30,43).

8. The robot according to claim 6, wherein the support wheel (49) can be turned about an axis (A) extending vertically to the rotary axle (50) for automatically adapting the position of support wheel (49) to the movement of the robot arm (30,43).

9. The robot according to claim 7, wherein the robot arm (30,43) comprises a swivel arm (30) and a support arm (43) which are articulated to each other.

10. The robot according to claim 7, wherein a double joint (42,44,45) is provided between the swivel arm (30) and the support arm (43) and at least one joint of the double joint (42,44,45) can be fixed in different positions.

11. The robot according to claim 8, wherein a pressure cylinder (33) is provided to swivel the swivel arm (30).

12. The robot according to claim 9, wherein the support arm (43) is adapted to have auxiliary instruments (52) mounted thereon.

13. The robot according to claim 6, wherein an extensible support leg (54) is arranged on the end of the robot arm (30,43) facing toward the rotary head (15).

14. The robot according to claim 13, wherein the support leg (54), under the effect of the forces generated when advancing the tool, is pressed onto the sewer pipe wall against a spring force.

* * * * *